United States Patent [19]

Smith, Jr. et al.

[11] Patent Number: 4,504,736
[45] Date of Patent: Mar. 12, 1985

[54] GAMMA RAY SPECTRAL TOOL FOR BOREHOLE USE

[75] Inventors: Harry D. Smith, Jr.; Tony M. Small, both of Houston; John G. Deaton, Brookshire, all of Tex.

[73] Assignee: Halliburton Company, Duncan, Okla.

[21] Appl. No.: 388,844

[22] Filed: Jun. 16, 1982

[51] Int. Cl.³ ............................................. G01V 5/04
[52] U.S. Cl. .................................................. 250/256
[58] Field of Search ............... 250/256, 265, 266, 267; 138/DIG. 1, DIG. 2, DIG. 7; 285/331, 332, DIG. 16

[56] References Cited

U.S. PATENT DOCUMENTS

| | | | |
|---|---|---|---|
| 1,196,928 | 9/1916 | Bylund | 277/167.5 |
| 2,857,522 | 10/1958 | Jones | 250/256 |
| 2,910,591 | 10/1959 | Baker | 250/267 |
| 4,171,626 | 10/1979 | Yates et al. | 464/181 |
| 4,363,137 | 12/1982 | Salisbury | 455/40 |

OTHER PUBLICATIONS

Bulletins No. 20, 21 and 25, "Fibercast® Pipe and Tubing Engineering Data . . . ", Fibercast Company, Tulsa, Oklahoma, (1958).

Primary Examiner—Janice A. Howell
Assistant Examiner—Constantine Hannaher
Attorney, Agent, or Firm—W. J. Beard

[57] ABSTRACT

This invention relates to a logging tool housing construction for use with gamma ray logging devices. The tool housing is constructed of materials designed for maximum transmission of low energy natural gamma ray energies (E=150−300 Kev). The housing material which encloses a gamma ray detector is a tubular, filament wound graphite composition and has a tubular metal sleeve for wear protection. The core and tubular metal sleeve are constructed and interconnected to meet mechanical and pressure requirements for oil well logging use.

6 Claims, 3 Drawing Figures 4,504,736

GAMMA RAY SPECTRAL TOOL FOR BOREHOLE USE

BACKGROUND OF THE INVENTION

1. Field of the Invention

The present invention is concerned generally with apparatus and methods for use in detecting and identifying the naturally occurring radioactive elements in earth formations traversed by a borehole. More particularly, the invention concerns methods and apparatus for use relative to detection and identification of elemental concentrations of silicon or calcium in earth formations in the vicinity of the borehole by analysis of spectra of naturally emitted gamma rays from elements contained in formations which also contain calcium or silicon. The technique is also used to detect iron in and around a borehole.

2. Description of the Prior Art

In recent years gamma ray spectroscopy of earth formations in the vicinity of a borehole has been made practical by the development by highly stable scintillation detectors which may be lowered into a borehole. The scintillation detector is responsive to the gamma ray spectrum of gamma rays impinging upon the scintillation crystal. At the present time, two commercial well logging services are available for detecting the natural gamma ray spectra produced by uranium, potassium, and thorium (or from their radioactive daughters) in earth formations in the vicinity of a borehole.

In the first of these commercially available services three energy ranges or windows centered about selected gamma ray emission peaks for naturally occurring gamma rays in the decay series of the aforementioned elements are selected. Gamma ray count rates in each of these three energy ranges are transmitted to the surface and processed by a technique called spectrum stripping wherein standard calibration spectra for each of the individual elements (made in standard boreholes) are applied to the measurements of count rates made in the energy ranges chosen to detect each of the three elements sought to be detected. So called "stripping constants" derived from the measurement of the standard spectra in standard boreholes for each of three elements are then applied to the measured spectrum in the unknown earth formations surrounding the borehole. An estimate of the percentage of the particular three elements desired to be detected is made based on the stripping technique.

In a second, slightly more sophisticated commercially available technique, (such as that described in U.S. Pat. No. 3,976,878 to Chevalier, et al issued Aug. 24, 1976) five energy ranges or windows are utilized for the measurement of the spectrum of natural gamma rays emitted by the earth formations in the vicinity of a borehole. The five energy range measurements used in this technique are employed in a least squares fitting scheme to determine the elemental concentrations of the three elements, again based on the spectrum of each of the individual elements of the three taken in standard boreholes. The use of the five windows gives an overdetermined set of equations (i.e. 5 equations in 3 unknowns) which are statistically enhanced by the use of the count rate data from the extra two energy windows to distinguish this technique from that described in the foregoing paragraph.

It is obvious in the logging operation that the logging tool must be capable of withstanding the temperatures and pressure encountered in a bore hole as well as the extremely high hydrostatic pressures which can be encountered. At the same time while requiring mechanical strength, the tool must possess suitable characteristics to transmit the gamma rays to be measured through the tool housing so that successful measurements may be made.

The present invention is concerned with the measurement of low energy natural gamma ray spectra emitted from downhole formations to provide formation lithology type and/or casing thickness. This information is derived by a measurement of the differences in the photoelectric absorption gamma ray cross-sections of the materials between the formation source and the detector in the logging tool. Because the photoelectric cross-sections are appreciable for most elements in and around a well borehole only at very low gamma ray energies ($E=20-200$ Kev), it is important that the tool housing be designed for maximum transmission of these low energy signals to the detector.

BRIEF DESCRIPTION OF THE INVENTION

In accordance with the concepts of the present invention a scintillation type detector is utilized in an instrument which is passed through a borehole. The gamma ray energy spectrum is detected by the scintillation detector within the tool housing.

The housing is characterized by a tubular graphite filament construction with a tubular aluminum shield. In a preferred embodiment, the tubular graphite construction has a tapered end which is received in a tapered recess formed between two metal joints. A tubular rubber sleeve and aluminum wear sleeve are concentrically mounted over the graphite construction for pressure and wear control.

BRIEF DESCRIPTION OF THE DRAWINGS

The present invention may best understood by reference to the accompanying description when taken in connection with the accompanying drawings in which

As illustrated in FIG. 1, a borehole traverses earth formations 10 and typically contains a drilling control fluid 11 which produces a hydrostatic pressure within the well bore to control pressures existent in the earth formations. The borehole may be cased, as with a steel casing 12, or be uncased or open hole. The logging tool 13 is sized to traverse the borehole by means of an electrical armored logging cable 14 which is spooled to a conventional winch arrangement (not shown) at the earth's surface. The logging tool contains instrumentation for measuring gamma ray spectral characteristics of the earth formations 10 penetrated by the borehole. Signals from the downhole tool 13 are conducted to the surface on conductors of the cable 14 and supplied to a surface computer 16 which performs signal processing techniques in order to extract the elemental constituents of silicon, calcium, or iron (as well as thorium, uranium, and potassium) present in the earth formations 10 which are then recorded as a function of borehole depth on the recorder 17. The well logging cable 14 passes over a sheave wheel 15 which is electrically or mechanically coupled (as indicated by a dotted line 18) to the computer 16 and recorder 17 in order to provide depth information about the downhole tool 13 for the surface recording process. The surface computer 16 may be, for example, a model PDP-11 provided by Digital Equipment Corp. of Cambridge, Mass. and can be programmed in a high level language such as FORTRAN to perform computations and to drive the output displays.

The downhole tool 13 contains near its lower end, a gamma ray detecting system comprising a scintillation crystal and a photomultiplier/amplifier package 18.

Figure 1:
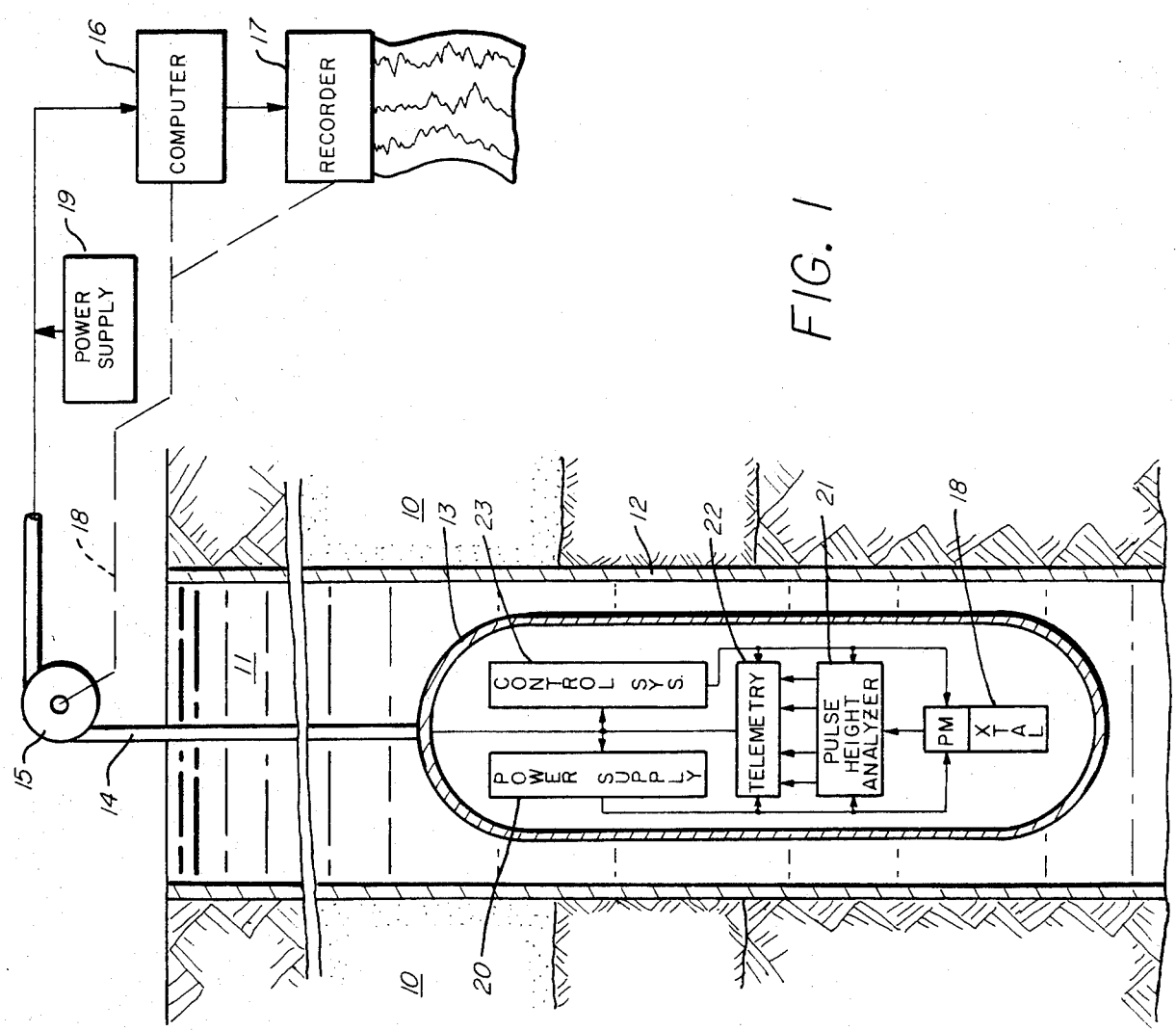
FIG. 1 illustrates a tool and well bore and a typical well bore logging operation.

Power for the operation of the downhole tool is supplied from a surface power supply 19 via conductors of the cable 14 to a downhole power supply 20 where it is converted to appropriate voltage levels and supplied to the downhole circuitry components of the system as indicated in FIG. 1. Gamma ray spectral signals are supplied from the photomultiplier tube to a pulse height analyzer 21 where they are separated into count rates. The pulse height analyzer provides the output signals to a telemetry system 22 where the pulse height gamma ray spectral information is converted to an appropriate digital form for transmission to the surface via conductors of the well logging cable 11. Downhole control circuits 23 provide timing pulses to the pulse height analyzer and telemetry system in order to synchronize the transmission at regular data intervals from the downhole tool to the surface equipment. These synchronization signals are also encoded in the telemetry system 22 and supplied to the surface computer 16.

Thus, naturally occurring gamma rays from the earth formations 10 are detected by the scintillation crystal photomultiplier detector system 18 in the downhole tool and are broken down into their energy constituents by the pulse height analyzer 21 and telemetered to the surface by the telemetry system 22 on conductors of the armored well logging cable 11. At the surface, the signals are processed in order to extract the elemental constituency of earth formations 10 penetrated by the borehole.

In explanation of the background for the present invention, photoelectric absorbtion is strongly influenced by the atomic number "Z" of the elements located between the source of radioactivity from the earth formations 10 and the detector 18 in the tool. For a given gamma energy, the absorption ($\sigma$) by the elements is proportional to a relationship expressed by the formula $\sigma \sim Z^{4.5}$. Thus if materials with atomic numbers greater than or approximately equal to those of the elements being observed, are incorporated or built into the tool housing then such materials will act as filters preventing the gamma ray information derivable from photoelectric absorbtion effects from reaching the detector 18 within the housing. For example, if the photoelectric absorbtion differences to be detected are between silicon (Z=14) and calcium (Z=20) in the formation, then a tool housing made of steel (Z=26) will absorb nearly all of the gammas in the energy range where the formation effects are appreciable. Thus, no significant lithology signal would reach the detector 18. Similarly casing weight (Z=26) measurements are also unduly attenuated by high Z tool cases.

The present invention is intended to minimize the overall photoelectric absorbtion effect of the tool housing by minimizing the equivalent atomic number of the materials in the tool housing yet maintain temperature, pressure and physical requirements for the tool.

Figure 2:
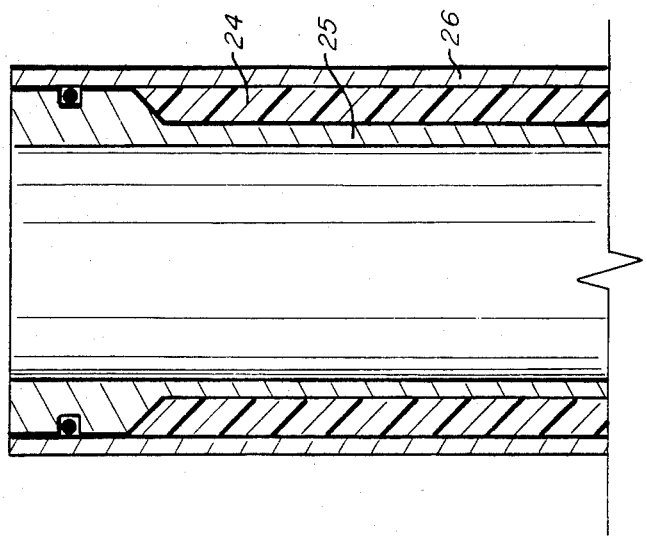
FIG. 2 illustrates in longitudinal cross-section of an embodiment of the present invention.

Referring now to the embodiment of FIG. 2, the housing consists of a two layer bonded graphite/epoxy composite tubular member 24 with an internal tube 25 fabricated from a 7075--T651 aluminum alloy and outer tubular aluminum case 26 with a friction fit over the bonded inner member 24. The outer aluminum case 26 which may incorporate a Teflon (a registered trademark of DuPont) anodized wear surface is intended to eliminate water seepage to the composite graphite/epoxy member 24 because the yield strength of the graphite/epoxy member will decrease if it is made subject to water. The outer aluminum case 26 has an O.D. or outer diameter of 3⅜ inches. The I.D. of the aluminum case 26 is 3.4 inches. The I.D. of the internal tube 25 is 2⅝ inches. The outer aluminum case may also include a thin rubber thickness or sheath to provide additional seepage protection.

The advantages of the above described housing construction are that the aluminum and graphite epoxy composite case 26 will transmit low energy gamma energy through 360° of the walls of the housing as contrasted to a single window type of tool. The selected materials of the housing with low "Z" factors reduce interference by the housing materials with the gamma ray spectrum to be detected and there are no adverse X-rays produced by virtue of the housing materials.

Where it is desired to measure the casing weight or thickness effects, a tubular case made of, for example, titanium can be used, in addition to the above described toolcase, and it will also be effective for use in high pressure operations. Titanium alloys provides a sufficiently low "Z" factor so that gamma ray detection to measure the casing thickness may be made.

Figure 3:
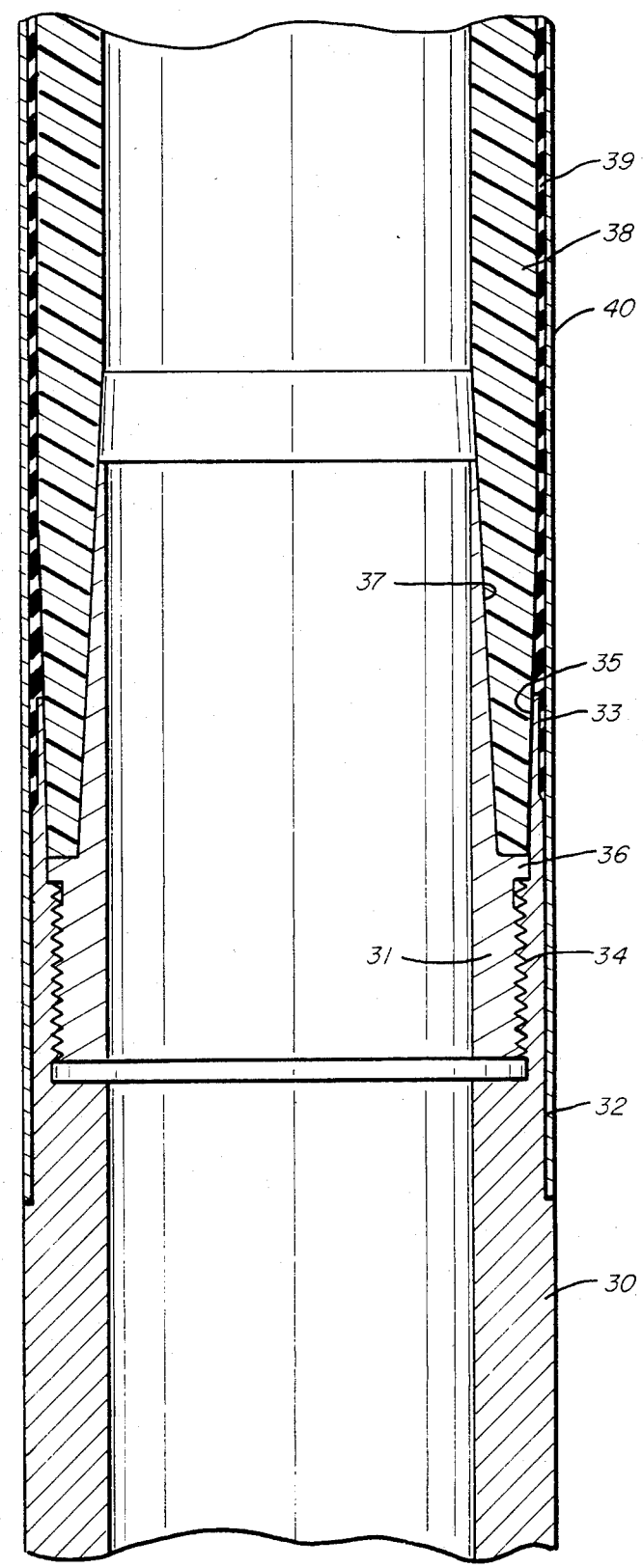
FIG. 3 illustrates in longitudinal cross-section of a preferred embodiment of the present invention.

Referring now to FIG. 3 in which an alternate low Z toolcase is shown, the housing construction includes threadedly interconnected, tubular members 30 and 31. The end of the lower tubular member 30 has a first, outer longitudinally extended recessed Section 32 and a second outer, longitudinally extended recessed section 33 which respectively have smaller diameters. The tubular member 30 has an internally threaded portion 34 located midway of the length of the first recessed sections 32. Above the threaded portion 34 is an outwardly tapering wall surface 35. Thus, the member 30 has a terminal end portion with outer diametrically stepped sections and an internal tapered section.

The lower end of the upper tubular member 31 has an outer threaded portion which is arranged to engage with the threaded portion 34 and a radially extended flange 36. When the members 30 and 31 are threadedly interconnected the flange 36 abuts the threaded portion 34. Above the flange 36, the member 31 has an inwardly tapering wall surface 37 which extends upwardly to the end of the member 31. The internal diameter of the member 31 is matched to the internal diameter of the lower member 30.

From the above described construction, it will be appreciated that the members 30 and 31 define a frustoconically shaped recess between the tapered walls 35 and 37. A complementarily shaped, frusto-conical end of a tubular composite material member 38 is tightly received in the recess between the tapered walls 35 and 37. The procedure for assembling members 30, 31, and 38 is as follows: (1) after it is determined that member 31 fits tightly into member 38, they are bonded together using a high temperature epoxy. (2) the threaded portion of member 31 and the externally tapered section of member 38 are coated with epoxy and threaded into member 30. (3) the epoxy is cured to complete the joint fabrication. Above the frusto-conical end, the member 38 has an internal diameter which is matched to the diameter of member 31 and an outer diameter which is matched to the outer diameter of the second recessed section 33. The tubular composite member 38 is constructed of graphite filaments wound in a cylinder and impregnated with epoxy. A filament wound structure is used because this type of composite is capable of higher stresses than other fiber-reinforced materials.

The outer surface of the member 38 and the second recessed section 33 can be enclosed with a thin tubular rubber sleeve 39 which provides a fluid tight seal for the member 38. A thin walled, removable tubular aluminum wear sleeve 40 encloses the rubber sleeve 39 and is sized to be received on the first recessed section 32. The outer diameter of the sleeve 40 conforms to the outer diameter of the member 30, and may incorporate a Teflon anodized outer layer.

The foregoing description may make other alternative arrangements according to the concepts of the present invention apparent to those skilled in the art. The aim of the appended claims therefore is to cover all such changes and modifications as are truly within the scope of the invention.

We claim:

1. A well logging tool sized and adapted for passage through a well borehole for use in detecting naturally occurring gamma rays, said logging tool comprising:

at least one pair of threadedly interconnecting tubular members, said tubular members when interconnected defining a frusto-conical recess, a tubular composite low atomic number member having at least one end with a complementarily shaped frusto-conical end for tight reception in said recess, a tubular elastomeric sealing member enclosing said low atomic number member;

wear resistant outer means enclosing said sealing member for protecting said sealing member from abrasion with the borehole; and means disposed within said low atomic number member for detecting gamma rays and separating them into an energy spectrum.

2. The apparatus of claim 1 wherein said recess in said tubular members is defined by upper and lower tubular parts where said upper part defines an inner wall surface and said lower part defined an outer wall surface, said lower part having external, stepped diametrical portions respectively for receiving said sealing member and said wear resistant means.

3. The apparatus of claim 2 wherein said tubular sealing member comprises a rubber tubular member.

4. The apparatus of claim 3 wherein said wear resistant outer means comprises an aluminum tubular member.

5. The apparatus of claim 4 wherein said tubular composite low atomic number member comprises a filamentary wound graphite member having an epoxy base.

6. The apparatus of claim 1 wherein said tubular composite low atomic number member comprises a boron filamentary wound member having an epoxy base.

* * * * *